United States Patent

Fruhauf

[15] 3,686,577

[45] Aug. 22, 1972

[54] SAMPLING AND HOLDING SYSTEM FOR ANALOG SIGNALS

[72] Inventor: Waldemar Fruhauf, Berlin, Germany

[73] Assignee: Krone GmbH, Berlin-Zehlendorf, Germany

[22] Filed: March 2, 1971

[21] Appl. No.: 120,204

[30] Foreign Application Priority Data

March 4, 1970 Germany..........P 20 10 171.7

[52] U.S. Cl. ....................328/151, 307/229, 307/235

[51] Int. Cl. ............................................H03k 17/00

[58] Field of Search ......328/151; 307/238, 229, 230, 307/235

[56] References Cited

UNITED STATES PATENTS

| | | | |
|---|---|---|---|
| 3,304,506 | 2/1967 | Weekes | 328/151 |
| 3,586,880 | 6/1971 | Fitzwater, Jr. | 328/151 X |
| 3,555,298 | 1/1971 | Neelands | 328/151 X |

OTHER PUBLICATIONS

Peaking and Noise Suppression Circuitry, by Bjorkman et al., IBM Technical Disclosure Bulletin, Vol. 9, No. 6, 11/66.

*Primary Examiner*—Donald D. Forrer
*Assistant Examiner*—B. P. Davis
*Attorney*—Karl F. Ross

[57] ABSTRACT

A first operational amplifier, lying in the charging circuit of a storage capacitor in series with a pair of antiparallel diodes, is connected in tandem with a second operational amplifier of unity amplification factor in the reading circuit of the capacitor. In the sampling mode, an input signal is applied to the first amplifier whose feedback path then includes the second amplifier; in the holding mode the input signal is cut off and the first amplifier is connected in a control path of the second amplifier so that the output voltage of the first amplifier becomes nearly equal to the capacitor voltage. At this point the diodes separate the capacitor from the output of the first amplifier to maintain the capacitor charge, with simultaneous closure of an ancillary feedback circuit for the first amplifier to equalize the potential on opposite sides of the diodes.

6 Claims, 3 Drawing Figures

Waldemar Frühauf
Inventor.

by: Karl G. Ross
Attorney

SAMPLING AND HOLDING SYSTEM FOR ANALOG SIGNALS

My present invention relates to a sampling and holding system for analog signals, e.g., as used in pulse-code modulation.

In my concurrently filed application Ser. No. 120,171 I have disclosed, as part of a pulse-code modulator, a sampling circuit including a pair of operational amplifiers in the charging circuit of a storage capacitor and in its reading circuit, respectively, the second of these amplifiers having a short-circuit feedback connection from its output terminal to its inverting or subtractive input terminal to provide an amplification factor of, virtually, unity. An electronic switch in the charging circuit, such as a field-effect transistor, periodically opens and closes that circuit for the alternation of sampling and reading (or holding) phases in the rhythm of a train of timing pulses. In order to neutralize the effect of switching transients upon the capacitor charge, an ancillary condenser is connected between that capacitor and the resistance-biased emitter of another transistor, directly receiving the timing pulses, whose collector controls the operation of the switching FET.

Even with this compensation of switching transients, the charge on the storage capacitor is affected by leakage currents which impair the fidelity of signal transmission and should therefore be minimized as much as possible. This is particularly true of storage condensers having a small enough capacitance for rapid charging, e.g., within an interval on the order of 1 $\mu$sec as required in conventional PCM systems.

It is, therefore, the general object of my present invention to provide an improved sampling circuit whose storage capacitance will maintain a substantially constant charge for an extended period.

Another object is to provide a method of operating a sampling circuit of the above-described general type, with a storage capacitor sandwiched between two operational amplifiers of unity amplification factors, to attain the aforestated result.

In accordance with this latter aspect of the invention, I connect the second amplifier in the feedback path of the first one during a charging phase, i.e., with simultaneous application of an input voltage to the first amplifier, and I thereupon reverse this connection during the subsequent reading phase (i.e., with the input voltage disconnected) by placing the first amplifier under the exclusive control of the second amplifier whose input directly receives the charging voltage of the storage capacitor.

By virtue of this reversed connection, the two tandemconnected operational amplifiers clamp the condenser charge at the value it has at the instant of switchover from sampling to holding.

In a system embodying the invention, therefore, I provide switching means for alternately connecting the second amplifier in a feedback path of the first amplifier and the first amplifier in a control path of the second amplifier with closure and opening, respectively, of an input connection by which an analog signal is fed to the first amplifier during the sampling phase.

In this sampling phase the first amplifier supplies the threshold voltage for one of two antiparallel-connected diodes so that with increasing input voltage a current flows from the output of the first amplifier through one diode into the capacitor, whereas with decreasing input voltage a current flows from the capacitor through the other diode into the output of the first amplifier.

During the holding phase, the diodes insulate the capacitor from the output of the first amplifier. For this purpose, there is established during the holding phase a control circuit or path which causes a decrease of the voltage at the diodes below the threshold value thereof and thus renders both diodes non-conductive.

The above and other features of my invention will be described in detail hereinafter with reference to the accompanying drawing in which.

Figure 1:
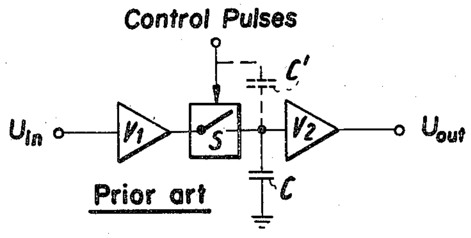
FIG. 1 is a block diagram of a conventional sampling circuit of the general type discussed above.

In FIG. 1 I have shown a conventional sampling circuit (cf. U.S. Pat. No. 3,304,507) wherein a storage capacitor C is charged through a first operational amplifier $V_1$ by way of an electronic (e.g., FET-type) switch under the control of timing pulses periodically applied thereto, the capacitor charge being read in the open state of the switch through a second operational amplifier $V_2$ delivering an output voltage $U_{out}$ to a load not shown. At C′ there is indicated the stray interelectrode capacitance of the switch which normally, in the absence of compensatory circuitry as noted above and disclosed in my copending application, would distort the stored voltage sample.

Figure 2:
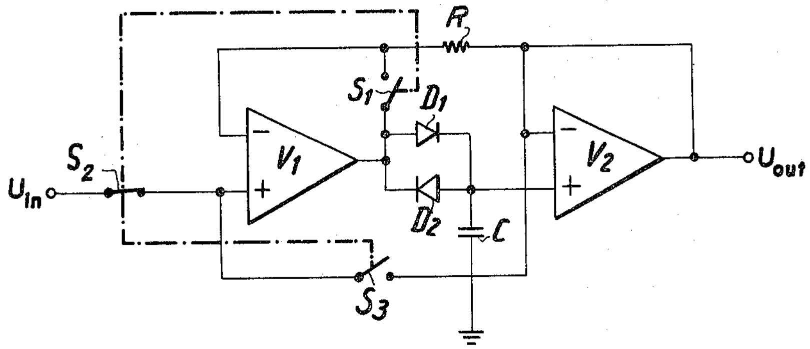
FIG. 2 is a circuit diagram of a sampler embodying my present improvements.

In FIG. 2 the switch S in series with capacitor C has been omitted and replaced by two oppositely poled diodes $D_1$, $D_2$ connected in parallel to the output of the first amplifier $V_1$. A switch $S_1$, open during the sampling phase, lies between the output of this amplifier and its subtractive or inverting input (−) while its additive or noninverting input (+) is connected to the source of signal $U_{in}$ by way of another switch $S_2$ which is closed during that phase. A third switch $S_3$, also open during the sampling phase, lies in a path which extends from the additive input of amplifier $V_1$ to the subtractive input of amplifier $V_2$ which, as shown, is connected by a permanent short circuit to the output thereof carrying the voltage $U_{out}$. A resistor R is connected between the two inverting inputs beyond the switch $S_1$ so as to be excluded from the individual feedback circuit of amplifier $V_1$ which is established upon closure of that switch.

The three switches $S_1$ — $S_3$, which in practice are analog switches of the solid-state type such as field-effect transistors, have been diagrammatically shown as ganged together for simultaneous operation by control pulses such as those indicated in FIG. 1.

Figure 3:
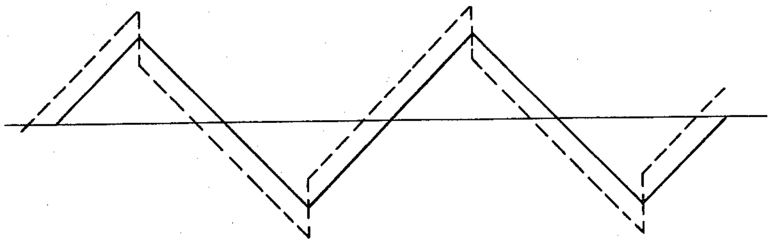
FIG. 3 is a graph illustrating the relationship of the input and output voltages of the first amplifier stage in the system of FIG. 2 during a sampling phase.

In the illustrated switch position, i.e., with switch $S_2$ the only one closed, the two amplifiers $V_1$ and $V_2$ operate as a unit with a feedback loop through resistor R and with an amplification factor of substantially unity for the amplifier $V_2$. A certain voltage differential exists between the additive input and the output of amplifier $V_1$, as illustrated diagrammatically in FIG. 3 by a solid and a broken line, respectively. In the presence of the rising flank of the input voltage $U_{in}$ the diode $D_1$ is conducting. Therefore the operational amplifier $V_1$ has to supply a voltage increased by the threshold voltage of the diode $D_1$ in order to equalize the output voltage $U_{out}$ of the operational amplifier $V_2$ and $U_{in}$. Similarly, in the presence of the descending flank of the input voltage $U_{in}$ the operational amplifier $V_1$ has to supply a voltage reduced by the threshold voltage of the diode $D_2$ for making $U_{out} = U_{in}$. Upon occurrence of the rising flank, current flows from the operational amplifier $V_1$ through the diode $D_1$ into the capacitor C which is discharged during the appearance of the descending flank through the diode $D_2$ so that current flows to the output of the operational amplifier $V_1$. This voltage differential, due mainly to the forward threshold of the conducting diode, results in a current flow through that diode which would continue to modify the charge on capacitor C even after the opening of switch $S_2$ if switch $S_1$ were not concurrently closed to make the output voltage of amplifier $V_1$ equal to its input voltage by virtue of the unity amplification factor. At the same time, the closure of switch $S_3$ directly connects the output of amplifier $V_2$ to the additive input of amplifier $V_1$ so that, since the amplification factor of stage $V_2$ is also unity, the potential on both sides of diodes $D_1$, $D_2$ is nearly the same. Normally, in the holding phase, offset voltages of the operational amplifiers $V_1$ and $V_2$ would maintain a residual voltage drop across the diodes $D_1$ and $D_2$. However, the high reverse resistance of diodes $D_1$ and $D_2$ prevents any change of the charge of capacitor C.

Resistor R, serving to prevent the flow of short-circuit current during the sampling phase in which the inverting inputs of the two stages are not necessarily at the same potential, now also lies between equipotential points so as not to be traversed by any current.

At the end of the reading or holding phase, switches $S_1$ — $S_3$ are again reversed to introduce the next sampling phase.

I claim:

1. A method of sampling an analog voltage by alternately charging a storage capacitor through a first operational amplifier and reading the charge on said capacitor through a second operational amplifier of unity amplification factor, comprising the steps of connecting said second amplifier in a feedback path of said first amplifier during a charging phase, with simultaneous application of an input voltage to said first amplifier, and subsequently placing said first amplifier under the exclusive control of said second amplifier during a reading phase, thereby generating in the output of said first amplifier a voltage substantially equal to the capacitor voltage, with concurrent disconnection of said input voltage from said first amplifier.

2. A method as defined in claim 1 wherein the capacitor is charged from said first amplifier through a pair of antiparallel diodes, comprising the further step of completing during said reading phase an ancillary feedback circuit excluding said diodes for said first amplifier.

3. A system for sampling and holding analog signals, comprising:
- a storage capacitance for a sample of an input signal;
- a charging circuit for said capacitance including non-linear resistance means and further including a first operational amplifier with a noninverting input connection leading to a source of said signal and with an output feeding said capacitance through said resistance means;
- a reading circuit for said capacitance including a second operational amplifier with a noninverting input tied to said capacitance and with an output connection leading to a load;
- and switch means for alternately connecting said second amplifier in a feedback path between the output and an inverting input of said first amplifier during a sampling phase and connecting the noninverting input of said first amplifier in a control path to the output of said second amplifier during a holding phase, with closure of said input connection during said sampling phase and opening of said input connection during said holding phase.

4. A system as defined in claim 3 wherein said second amplifier has a unity amplification factor and is provided with an inverting input directly connected to the output thereof, the inverting input of said first amplifier being connectable by said switch means in an ancillary feedback path to its own output during said holding phase for establishing a unity amplification factor for said first amplifier.

5. A system as defined in claim 4 wherein said resistance means comprises a pair of antiparallel diodes said ancillary feedback path excluding said antiparallel diodes.

6. A system as defined in claim 5, further comprising a resistor inserted between the inverting inputs of said first and second amplifiers, said ancillary feedback path excluding said resistor.

* * * * *